C. ALVORD.
Wheel Cultivator.
No. 84,931. Patented Dec. 15, 1868.
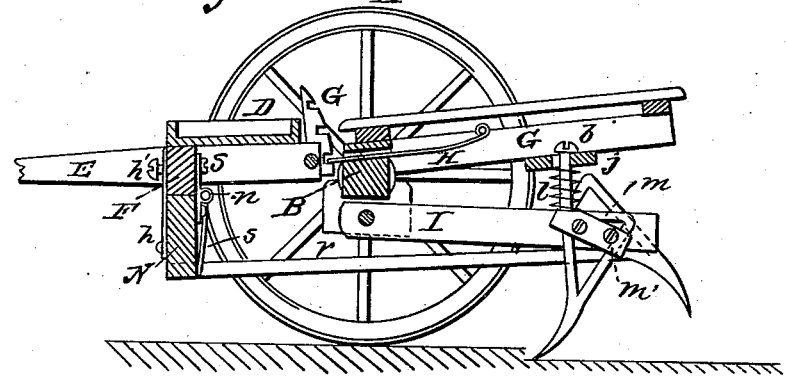
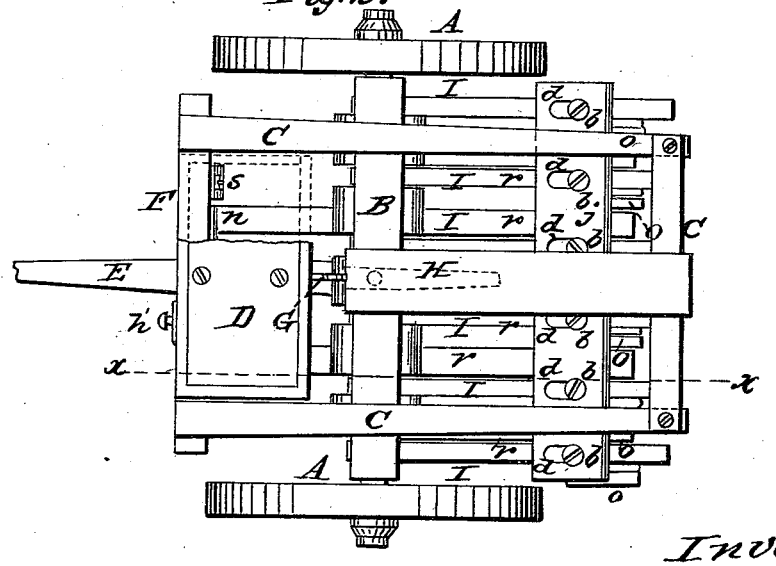
Witnesses:
C. A. Pettit
J. C. Kennon
Inventor:
Clark Alvord
by Kennon &c.
Attorneys

CLARK ALVORD, OF WESTFORD, WISCONSIN.

Letters Patent No. 84,931, dated December 15, 1868.

IMPROVEMENT IN CULTIVATORS.

The Schedule referred to in these Letters Patent and making part of the same.

*To all whom it may concern:*

Be it known that I, CLARK ALVORD, of Westford, in the county of Dodge, and State of Wisconsin, have invented a new and improved Cultivator; and I do hereby declare that the following is a full, clear, and exact description of the construction and operation of the same, reference being had to the accompanying drawings, making a part of this specification, in which—

Figure 1 is a longitudinal vertical section through line $x\ x$ of fig. 2.

Figure 2 is a top view.

This invention comprises four separate improvements in cultivators, namely, first, a new method of attaching the teeth; secondly, a new device for holding them in the ground; thirdly, an improved apparatus for cleaning them; and, lastly, a novel construction of the frame, draught-pole, and cleaning-apparatus, for the purpose of enabling the teeth to be raised or lowered conveniently, and of fixing them in contact with the ground, or at any required elevation above it.

In the drawings—

A A are the wheels;

B, the axle, connecting them; and

C, a rectangular horizontal frame, mounted upon said axle, and rigidly attached to it, about one-third of the frame coming forward of the axle, and the rest behind it.

The driver's seat is supported upon this frame, above or just in the rear of the axle, and his feet rest upon the frame, or a platform attached to it above the axle, or upon a platform, D, bolted to the rear end of the draught-pole E.

The front cross-beam F of frame C is pivoted to the side-beams of the frame, or, in other words, is a rock-shaft-bearing in the side-beams.

The draught-pole passes over it, and is rigidly attached to it, so that the vertical rocking of the draught-pole rocks the beam.

The front edge of platform D rests upon the beam, and the platform rocks with the beam and the draught-pole.

The rear end of the draught-pole is provided with a vertical curved rack, G, notched in its rear edge, and operating, in connection with an eccentric lever or button, H, to lock the draught-pole at any required inclination to the plane of frame C.

I I are the drag-bars, or plow-beams, jointed to the under side of the axle by any suitable means, and extending back under the frame C.

J is a wide, flat cross-bar, firmly fixed to the under side of frame C, not far from its rear end, and provided with an elongated slot, $a$, over each drag-bar, extending in the same direction with the drag-bar.

A headed bolt, $b$, firmly fixed to the drag-bar, extends up through the slot, the head of the bolt coming above the bar J, and preventing the bolt from becoming disconnected from the latter.

A spring, $i$, between the drag-bar and the bar J, serves to press the former down, and hold the teeth or plows in the ground, allowing them to rise over immovable obstacles.

The shanks of the teeth are made in a triangular form, and are clamped to the side of the drag-bar by means of two screw-bolts, $m\ m'$, and a clamping-plate, $o$, the clamping-plate being placed against the triangle, and, by the operation of the screw-bolts, clamping the latter between it and the drag-bar with any required degree of firmness.

I am aware that the rear end of the drag-bar has heretofore been slotted or split, and the teeth inserted in the slot and confined by clamping the sides of the drag-bar together.

My method of construction differs entirely from that, by employing the independent and removable clamping-plate, which may be made of wood or iron, which is adjustable as it wears away, so as always to keep the teeth firmly clamped, and which, when too much worn, can be removed, and a new one substituted in a moment.

It can also be employed with any form of tooth, being by no means confined to the triangular form.

In connection with the above-described parts, I employ, for the purpose of cleaning the teeth when they become foul, a set of cleaning-bars, $r\ r$, extending from under the front end of frame C, back between the teeth, and in contact with their sides, as seen in the drawings.

The forward ends of the cleaning-bars are all rigidly attached to a strong, deep cross-beam, N, which is supported by the rocking cross-beam F, being hinged at its rear upper edge to the latter, as shown at $n$.

A stout spring, $s$, attached to the beam F, presses against the rear side of beam N, and holds the latter in the position shown in fig. 1, unless considerable force is employed, in which case the spring will yield and allow the lower beam to swing slightly on its hinge.

A hasp, $h$, attached to the lower beam, and locking over a staple, $h'$, in the upper, on the front side of both, may be employed to hold the two beams in the relative position represented in fig. 1.

The operation of a device thus constructed is as follows:

By disengaging the lever H from the notched rack G, and throwing the driver's weight in front of the axle, (either upon the platform D, or frame F,) the whole apparatus is rocked upon the axle as a fulcrum, in such a manner as to raise the teeth out of the ground, and throw down the rear ends of the cleaning-bars, which, as they scrape down along the sides of the teeth, thoroughly clean them of the grass, roots, and other trash adhering to them.

If the hasp $h$ is locked, the teeth cannot be raised any higher than the position above described; but, if the hasp be unlocked, the joint $n$ will yield when sufficient weight is thrown upon the platform, and allow the teeth to be raised to any desired elevation.

In travelling to and from the field, the teeth may be thus elevated and locked in position by inserting the edge of the eccentric-lever H into one of the upper notches of the rack.

The function of the spring $s$ is to press the rear ends of the cleaning-bars down with a considerable force, so that, when the teeth are raised, the cleaning-bars will not rise with them, as would often be the case were no springs employed, but will scrape the sides of the teeth, and clean them in the manner described.

In case it be desired to use the cultivator in soil not liable to clog the teeth, the beam N, with the cleaning-bars attached to it, may be detached and removed by simply taking the pintles out of the hinges $n\ n$.

This beam, and the cleaning-bars, when in position, serve to properly balance the whole machine upon the axle. When removed, the proper equilibrium may be maintained by placing a few stones, or other suitable weight, upon the platform D.

In that case, the driver can walk behind and raise the plows, or depress them, by means of the rear cross-bar of frame C, using it as a plow-handle, it being properly rounded for convenient handling.

Knobs or handles may be attached to it for greater convenience, if preferred, and the handle of lever H may be extended back, so as to be within the driver's reach.

Having thus described my invention,

What I claim as new, and desire to secure by Letters Patent, is—

1. Clamping the teeth to the side of the drag-bars by means of the independent plate $o$, and the two screw-bolts, when the several parts are constructed and arranged to operate in the manner described.

2. The arrangement of the slotted cross-bar J, drag-bars I I, headed bolts $b$, fixed to the drag-bars, and extending through the slots of beam J, and springs $i\ i$, substantially as shown and described.

3. The employment of cleaning-bars $r\ r$, arranged in relation to the teeth, substantially as described, and operating to clean the teeth when the latter are raised, or when the bars are depressed, as herein set forth.

4. The combination of the cleaning-bars $r\ r$, beam N, spring $s$, and hinge $n$, when employed on a cultivator, for the purpose specified.

5. The combination of the frame C, rocking with the axle, as described, with the draught-pole E pivoted to the front beam of the frame, the plow-beams I I, the cleaning-bars $r\ r$, and the spring $s$, substantially as and for the purposes herein described.

6. In combination with the rocking-beams F and N, cleaning-bars $r\ r$, and drag-beams I I, the hasp $h$ and staple $h'$, arranged, as described, on the two beams, and operating in the manner and for the purposes herein described.

CLARK ALVORD.

Witnesses:
LYSANDER HILL,
NATHAN K. ELLSWORTH.